July 30, 1929.   C. B. ST. JOHN   1,722,342
RESTAURANT SYSTEM
Filed Sept. 24, 1926   4 Sheets-Sheet 1

Inventor
Charles B. St. John
By
Attorney

July 30, 1929.　　　C. B. ST. JOHN　　　1,722,342
RESTAURANT SYSTEM
Filed Sept. 24, 1926　　　4 Sheets-Sheet 2

Inventor
Charles B. St. John
By
Attorney

July 30, 1929.  C. B. ST. JOHN  1,722,342
RESTAURANT SYSTEM
Filed Sept. 24, 1926   4 Sheets-Sheet 3
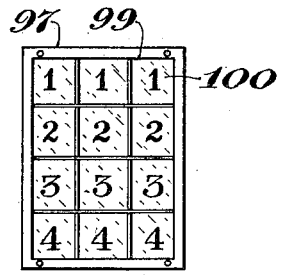
Fig. 6
Fig. 7
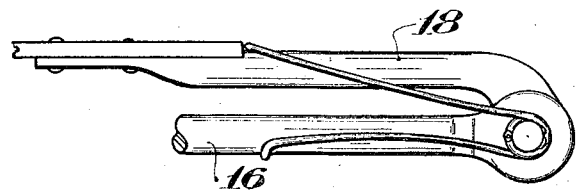
Fig. 8
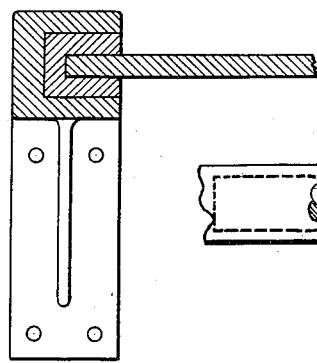
Fig. 10
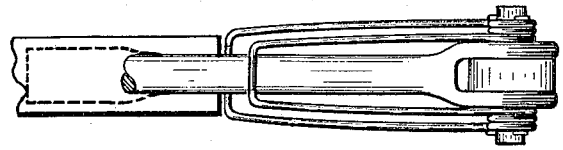
Fig. 9
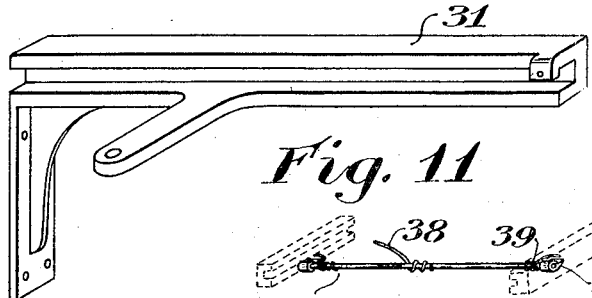
Fig. 11
Fig. 12
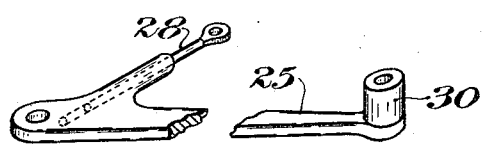
Fig. 13
Inventor
Charles B. St. John
By
Attorney July 30, 1929.  C. B. ST. JOHN  1,722,342
RESTAURANT SYSTEM
Filed Sept. 24, 1926   4 Sheets-Sheet 4
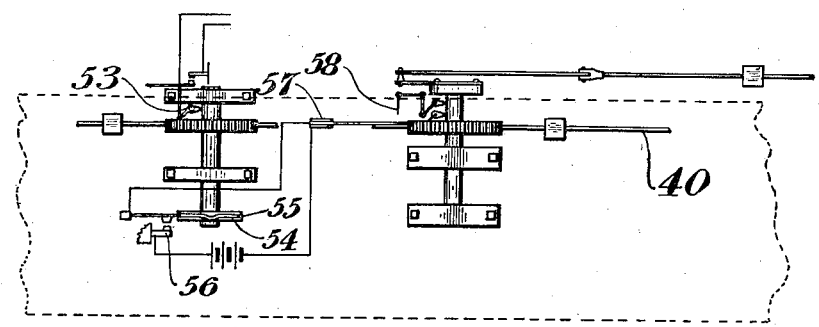
Fig. 14
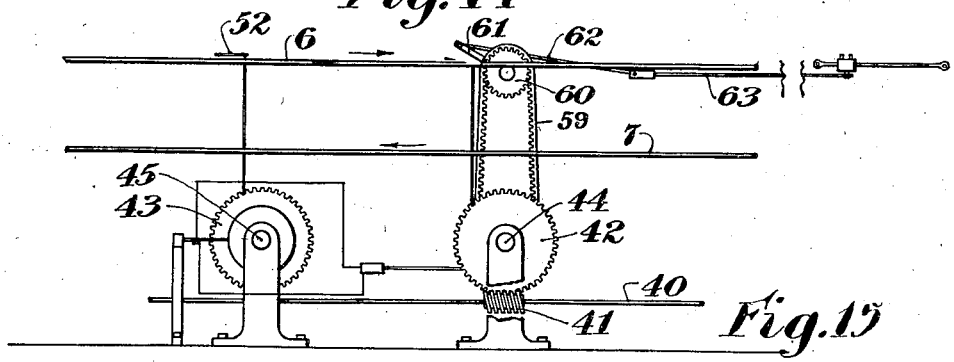
Fig. 15
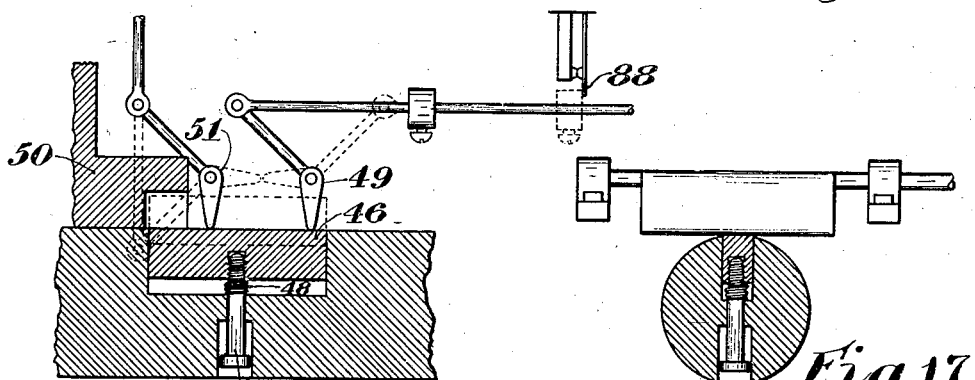
Fig. 16  Fig. 17
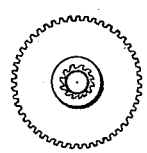
Fig. 18
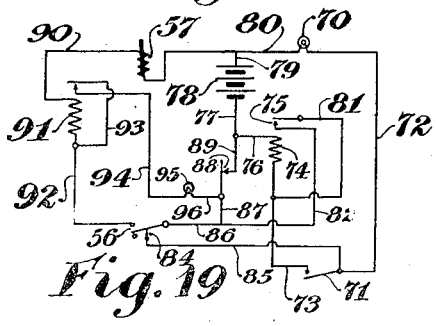
Fig. 19
Inventor
Charles B. St. John
By 
Attorney Patented July 30, 1929.

1,722,342

UNITED STATES PATENT OFFICE.

CHARLES B. ST. JOHN, OF ST. PAUL, MINNESOTA.

RESTAURANT SYSTEM.

Application filed September 24, 1926. Serial No. 137,495.

The present invention relates to a restaurant system, and more particularly to a restaurant system having a means for conveying food to distributing stations along the path of a conveying device.

In the serving of large numbers of customers in a restaurant in a short space of time, as is desirable during the noon hour in cities, and at fairs and other large gatherings of people, it is desirable to serve the patrons as quickly as possible so as to have them occupy serving space as short a time as possible.

An object of the present invention is to signal an order for food, from a point adjacent the patron to whom the food is to be served, to the kitchen; and to deliver the food mechanically from the kitchen to a receiving station adjacent the point from which the order was signalled.

A further object is to convey food to a predetermined station, and to mechanically transfer said food from the conveying means to said station.

In order to attain these objects there is provided, in accordance with one feature of the invention, a counter having a conveyor mounted to operate therein, and having a transferring device mounted adjacent said conveyor to engage a tray of food carried by said conveyor at a predetermined point along the route thereof, and to move said tray from said conveyor to a receiving station provided therefor.

The receiving station is preferably normally retained in position beneath the conveyor in an inoperative position and is moved outwardly into a receiving position upon an actuation of the transferring device by means associated therewith.

These and other features of the invention, not specifically mentioned, will be more fully brought out in the following description and the accompanying drawings, wherein:

Figure 6, is a view in front elevation of a signalling device.

Figure 7, is a view in vertical section of the device shown in Figure 6.

Figure 8, is an enlarged view of a spring used to resiliently retain parts of the food transferring mechanism in a normal position.

Figure 9, is a view in top elevation of the device shown in Figure 8.

Figure 10, is a sectional view on the line 10—10 of Figure 4.

Figure 11, is a view in isometric perspective of a shelf supporting bracket.

Figure 12, is a view in isometric perspective of a trip locking device for the shelf mechanism.

Figure 13, is a view, in isometric perspective, of a bell crank lever for moving a tray receiving platform into an operative position, a central portion of one arm thereof being broken away.

Figure 14, is a view in top elevation of a timing mechanism.

Figure 15, is a view in side elevation thereof.

Figure 16, is a longitudinal sectional view of a drive shaft showing a dog and releasing cams associated therewith.

Figure 17, is a view in transverse section on the line 17—17 of the mechanism shown in Figure 16.

Figure 18, is a reduced view in side elevation of a worm gear having an internally toothed gear connected thereto; and Figure 19, is a schematic circuit diagram of the electrical portion of the invention.

Figure 1:
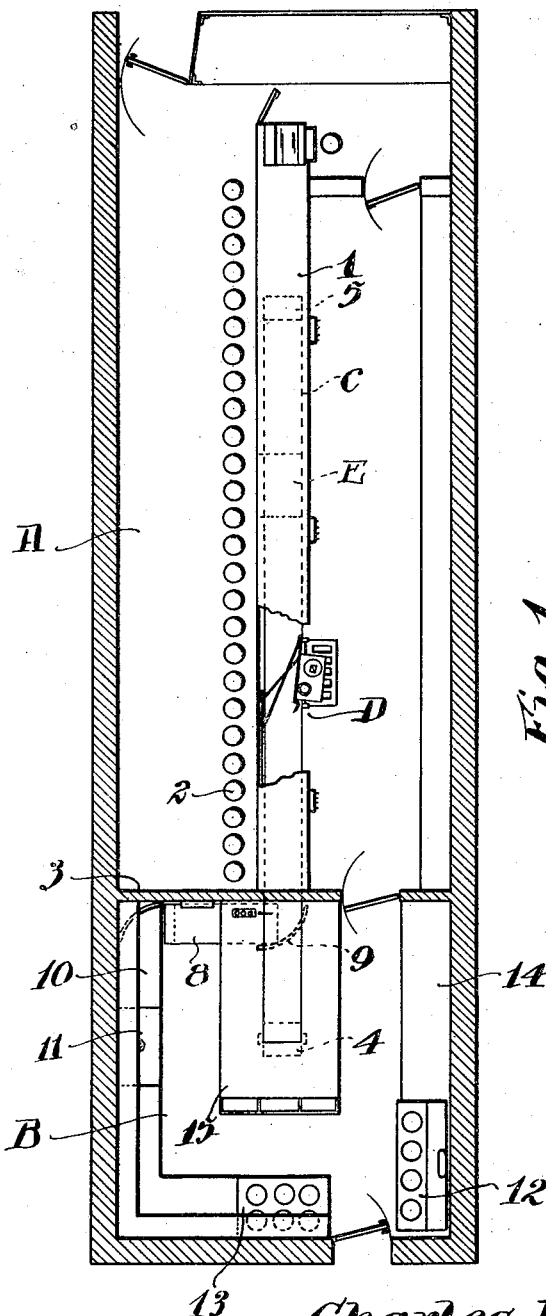
Figure 1, is a plan view of a restaurant equipped in accordance with the present invention.
Figure 2:
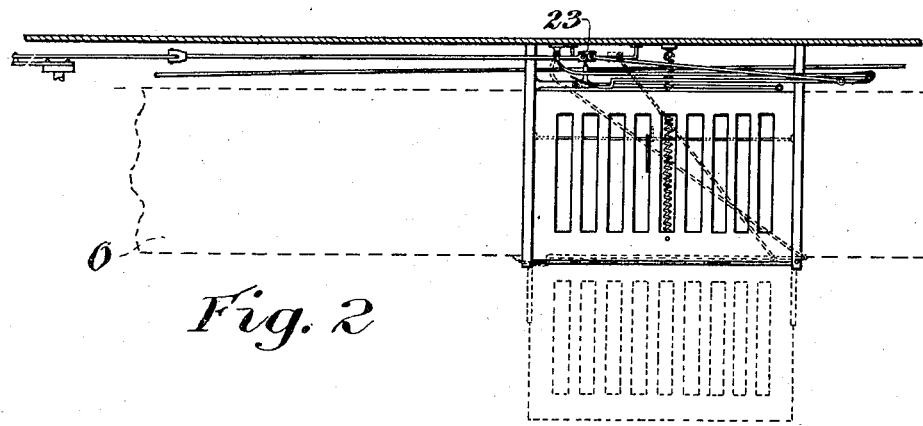
Figure 2, is a view in top elevation of a tray transferring mechanism shown in a normal position in solid lines and in an operated position in dotted lines.

Referring to the drawings in detail, a restaurant comprises a forward portion A and a kitchen portion B. A counter 1 is mounted longitudinally of the forward portion with stools 2 positioned adjacent thereto in a customary manner.

Beneath the counter is mounted a conveyor belt C of a conventional type which extends through an opening in a wall 3 which separates the kitchen from the forward portion A. The counter 1 preferably fits closely against the wall 3 so that the entire conveying mechanism is concealed by the counter.

The conveyor may be of a conventional type having a head roller 4 with suitable drive mechanism, not shown, operatively connected thereto, and a tail roller 5 mounted for free rotation in suitable supports. The belt may be of rubber covered fabric or other suitable material, being preferably of a substance which is impervious to moisture for sanitary reasons.

The top run 6 of the conveyor belt in the construction illustrated is devised to carry trays of food to suitable receiving stations D and E. The lower run 7 of the belt is employed to carry used dishes back to the kitchen. In the kitchen, a belt 8 is mounted transversely of and just below the main conveyor belt. A plow 9 which may be of a type commonly employed to transfer articles from one conveyor belt to another is mounted diagonally across the lower run of the main conveyor belt to transfer trays of used dishes from the main conveyor belt to the transverse belt 8. The transverse belt 8 carries the used dishes to a receiving table 10 from whence they may be transferred manually to a dishwashing machine 11. After washing, the dishes may be placed on shelves provided around the kitchen for that purpose.

A cooking range is indicated at 12 with a steam table at 13, while the counter 14 for preparing food is provided adjacent the range. A U-shaped serving table 15 encircles the kitchen end of the conveyor belt and provides a convenient place for assembling the meals to be served upon trays which in turn are placed upon the conveyor belt for delivery to the stations.

It is to be understood that the arrangement of the kitchen is described merely as showing a preferred arrangement thereof, and forms no part of the present invention.

Transferring mechanism is provided adjacent each receiving station to transfer trays of food from the conveyor to the receiving stations. This transferring mechanism, best shown in Figures 2, 3, and 4, and Figures 8 to 13, inclusive, comprises an arm 16 pivotally mounted upon a bracket 17 and having pivotally connected to its outer end a plow member 18. The free inner end of the plow member is offset as at 19 and then curved back as at 20 to engage a tray of food and move it laterally of the conveyor belt. The arm 16 and the plow member 18 are embraced by a spring 21, shown in Figures 8 and 9 which has extra tension to normally resiliently hold the plow 8 adjacent the member 16.

A push rod 22 is pivotally connected at its forward end to the plow member while the rear end thereof is pivotally connected to a slide member 23. The slide member has a square central opening and is mounted upon a square rod 24 to slide freely thereon without turning.

A bell crank lever 25 is pivotally mounted upon an extension 26 of a shelf supporting bracket 27. One arm of said bell crank lever has a telescopically extensible portion 28, the outer end of which is pivotally connected to the downwardly projecting stud 29 of the slide member 23. The other arm of the bell crank lever is provided with a roller 30 on the outer end thereof, which is in rolling engagement with the rear edge of a slidable shelf mechanism mounted to slide freely in brackets 27 and 31. The shelf 32 has a spring 21 connected thereto to resiliently return the shelf mechanism to normal after an actuation thereof.

A locking mechanism E is mounted in the shelf to hold the shelf in an extended position when a tray of food is in position thereon and to release the shelf for a return to normal upon the removal of said tray. This locking mechanism may comprise a rod 33 pivotally mounted upon the shelf and having pawls 34 and 35 mounted upon each end thereof. Said pawls are mounted to engage notches 36 and 37, respectively, on each side of the lower surface of the brackets 27 and 31 when the shelf is in an operated position, and a lever 38 is held down by a tray of food resting thereon. This holds the shelf in an extended condition as long as the pawls are held in engagement with said notches. A spring 39 is mounted with respect to the rod 33 to place a resilient torque thereon tending to move the pawls into an inoperative position. The lever arm 38 is permanently connected to the rod 33 and is positioned to normally extend above the upper surface of the shelf 32. When a tray is placed upon the shelf it rests upon the arm 38, depressing it, and thereby rotating the rod 33 against the tension of the spring 39. This moves the pawls into engagement with the notches in the lower face of the brackets to maintain the shelf in an extended position to support a tray. Upon removing the tray the lever 38 is freed for upward movement, whereupon the spring 39 rotates the rod 33, releasing the pawls and permitting the spring 21 to draw the shelf back to a normal position below the conveyor belt.

Figure 3:
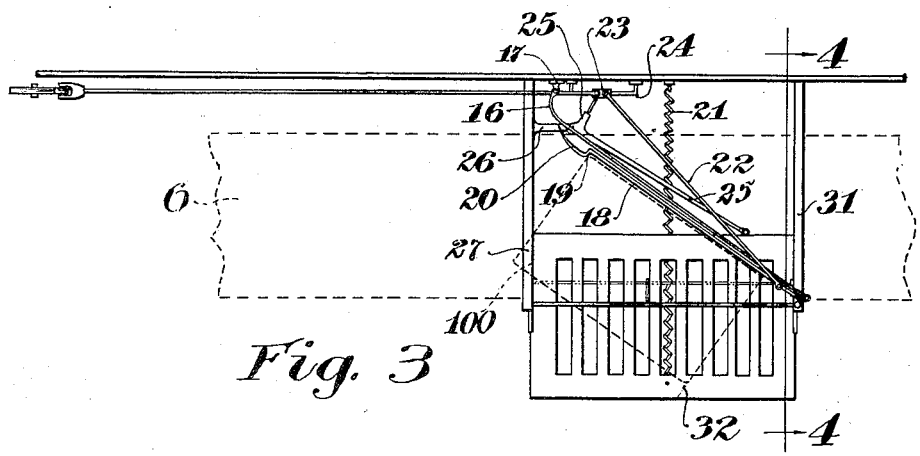
Figure 3, is a view similar to Figure 2, showing the food transferring mechanism in partly operated position.
Figure 4:
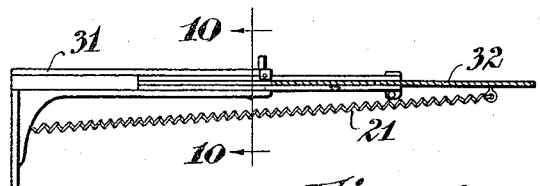
Figure 4, is a sectional view on the line 4—4 of Figure 3.

The operation of the transferring mechanism is so timed that a tray of food carried by the conveyor belt and destined for transfer at a predetermined station will encounter the plow member 18 of said station in the position shown in Figure 3. The plow member 18 is then moved pivotally outward by means of the push rod 22 to the dotted line position shown in Figure 2, which action completely removes the tray from the conveyor to the receiving station.

To insure that each tray shall be delivered to its proper station, a timing mechanism is associated with the operating means for each station to prevent the actuation of the transferring mechanism until the tray is adjacent the station of its destination.

The timing and tray transferring mechanism is here shown in Figures 14 to 19, inclusive, as being of a combined electrical and mechanical type. A shaft 40 is mounted lengthwise of the counter and rotates at a predetermined speed with respect to the speed of the conveying mechanism. A worm gear 41 is mounted upon the shaft 40 to cooperate with the gear 42, and a second worm gear, not shown, is mounted upon the shaft to cooperate with a timing gear 43. The gears 42 and 43 rotate continuously during the operation of the device, being freely rotatable upon shafts 44 and 45, respectively. Each of the shafts 44 and 45 is provided with a clutch release mechanism of a well known type, such as is illustrated in Figures 16 and 17. This clutch mechanism is substantially the same for both gears and will, therefore, be described in detail for one of said gears only. The only difference between the clutch release mechanism for the gear 42 and that for the gear 43 being that a pair of releasing cams are provided for the gear 42, while but a single cam is provided for the gear 43. The release mechanism for the gear 42 only will be described in detail. It comprises a dog 46, which is slidably mounted in a depression in the shaft 44, being provided with a headed member 47 mounted to slide freely in an opening in the shaft and having threaded engagement with the inner side of the dog 46 to limit the outward movement thereof. A coil spring 48 encircles the shaft of the headed member 47 and tends to resiliently urge the dog 46 outward into an operative position such as illustrated in dotted lines in Figure 16. A pair of releasing cams 49 and 51, Figure 16, are pivotally mounted to engage the dog 46 upon a rotation of the shaft and force it into an inoperative position. Both of said releasing members must be operated simultaneously to release the dog 46. The gears 42 and 43 are each provided with an internally toothed gear, permanently connected thereto and mounted over a portion of said dog. When the dog is released and is forced up into an operative position by the spring 48, as illustrated by dotted lines in Figure 6, the dog engages one of the internal teeth of the gear and causes the rotation of the shaft 44 or 45 with the gear 42 or 43 with which it is associated. As soon as the releasing member or members returns to a normal position, as shown in Figure 17, and in solid lines in Figure 16, the dog 46, upon rotating into position against said releasing member or members is depressed, thereby being forced out of engagement with the internally toothed gear stopping the shaft and again permitting said gear to rotate independently of its shaft.

The timing and transferring mechanism is shown for a single station only, since the mechanism for each of the remaining stations would be a mere duplication of the parts herein illustrated and described.

Figure 5:
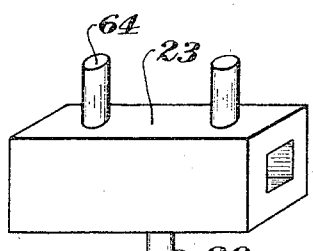
Figure 5, is an enlarged view of a slide which forms a portion of the food transferring mechanism.

A lever 52 is pivotally mounted in the kitchen adjacent the point at which the trays are placed upon the belt, and closely overlies the belt, so that a tray in passing the lever will actuate it. This lever is connected to a releasing cam 53 associated with gear 43 to move said member to a releasing position upon an actuation of said lever. The release of the dog associated with gear 43 corresponding to the dog 46 in the detailed description of Figure 16 upon the actuation of the lever 52 permits the dog to engage the internally toothed gear and rotate the shaft 45 and with it the cam 54 which is keyed to the shaft 45. Riding in a slot 55 in the cam 54 is a lever which is connected to a switch mechanism 56. The cam is mounted to close the switch mechanism after a predetermined time interval. The dog 46, associated with the gear 42, is normally held in a depressed position by the two releasing members 49 and 51, which must both be released simultaneously to release the dog for engagement with the internally toothed gear 50. The releasing member 51 is operated by a solenoid 57 which is connected by suitable conductors to the switch 56, which is operated by the cam 54 connected to the mechanism associated with the gear 43. The second releasing member 49 is connected by means of suitable levers to a small arm 58 mounted to extend transversely over the upper run of the belt in the path of trays carried by said belt. A sprocket, not shown, is permanently connected to the shaft 44 to rotate therewith and is connected by means of a drive chain 59 to drive a second sprocket 60. A lever arm 61 is connected to rotate with the sprocket 60 and has a connecting rod 62 which connects its outer end to a push rod 63 which in turn is connected to an upper stud 64 of the slide member 23, see Figure 5. The releasing member 49, associated with the lever 58, is moved to a releasing position by the passage of each tray which is carried past this point by the conveyor belt. It is apparent, however, that unless the second releasing member 51, which is operated by the solenoid 57, is also in an operated position, that the transferring mechanism will not be operated, whereas, if the first releasing member 5 is in a released position at the time of the passage of the tray, that said tray will operate the releasing cam 49 and release the dog 46, permitting it to engage the internally toothed gear 50 and rotate the lever 61 which operates the transfer ring mechanism and moves the tray to the station with which the mechanism just described is associated.

The cam 54 is arranged to close the switch 56 and operate the solenoid 57 a few seconds before a tray designated for said station engages the release lever 58. This cam is released for operation by pressing a button or key 83 in the kitchen which energizes the mechanism associated with lever 52 for the required transferring station.

The electrical circuit for use with the invention is schematically illustrated in Figure 19. A lamp 70 is preferably mounted in a device such as is illustrated in Figures 6 and 7, located in the kitchen, and is one of a series of four for each station by means of which orders for meals are signaled. A switch key 71 is one of a series of four which are provided at each receiving station and by means of which the orders are signaled to the kitchen. The key 71 is connected by means of conductor 72 to the lamp 70 and by means of a conductor 73 to the coil 74 of a relay 75. The other end of the coil of the relay is connected by means of conductors 76 and 77 to a battery 78 and by means of conductors 79 and 80 to the lamp 70.

The upper contact of the normally open relay 75 is connected by means of a conductor 81 to the conductor 73, and the lower contact of the relay 75 is connected by means of conductors 82 and 83 to the arm of a normally open key 56. The back contact 84 of the normally open key 56 is connected by means of a conductor 85 to the key 71.

Upon closing the key 71 the lamp 70 will be lighted and the relay 75 will be operated. This closes a locking circuit from conductor 73 through conductor 81, the contacts of relay 75, conductor 82, the back contact 84 of key 56, conductor 85, conductor 72, the lamp 70, conductors 80 and 79, to battery 78.

Upon closing the key 56 a circuit is completed through conductors 86 and 87, the normally closed switch 88, conductors 89 and 77, battery 78, and conductors 79 and 80, to the solenoid 57, whence conductor 90 is conducted to the coil of the relay 91, the other end of said coil being connected by means of conductor 92 to the other contact of the switch key 56.

Upon closing the key 56 the locking circuit of the relay 75 is opened through the back contact of switch 56, thereby opening the circuit through the light 70 and extinguishing said light and at the same time opening relay 75. The closure of the key 56 operates the solenoid 57 and simultaneously the relay 91, thereby closing a locking circuit for said relay through conductor 93, the contacts of relay 91, conductor 94, the lamp 95, conductor 96, the normally closed switch 88, conductors 89 and 77, battery 78, conductors 79 and 80, solenoid 57, conductor 90, and the coil of relay 91. This locking circuit remains locked until the switch 88, mounted in the path of movement of the releasing member 49, is opened, as shown in Figure 16. The releasing member 51 is opened upon the actuation of the solenoid 57 upon the closing of the switch 56. This switch is operated by the timing cam 57 when the tray is approaching its proper station for transfer. The opening of the locking circuit by the opening of switch 88 as just described, releases the solenoid 57 which releases the cam 51 and opens the relay 91, restoring the entire circuit to normal. A lamp 95 may be mounted adjacent each of the switch keys 56 to indicate that the key is in an operated condition and that it should not again be used until the circuit is cleared by the opening of the normally closed switch 88. There are four lamps 70 and keys 7; at each station, while there is but one solenoid 57, key 56, and lamp 95. It is to be understood, therefore, that for each circuit including the solenoid 57, lamp 95, and keys 56 and 88 there are four circuits, including keys 71, lamps 70, and release 74. The central circuit is illustrated to avoid complicating the drawings, since it is a simple matter for one familiar with the art to install additional circuits as required.

The extensible end 28 of the bell crank lever 25 is pivotally connected to the lower pin 29 of the slide 23 so that the bell crank lever 25 will be moved pivotally in a clockwise direction upon the actuation of the transferring mechanism, causing the roller 30 to move the shelf 32 outwardly into an operated position shown in dotted lines in Figure 1. As the shelf is thus moved to an operated condition, the tray to be transferred to said shelf is simultaneously moved laterally from the conveyor onto the shelf. The tray 101 riding over the lever 38 depresses this lever and moves the pawls 34 in the manner previously described into locking engagement with the notches in the brackets 27 and 31 to lock the shelf in an extended position. The transferring mechanism is returned to normal upon the completion of a transferring operation by the completion of the cycle of rotation of the operating lever 61. Simultaneously the bell crank lever 25 is also returned to normal by the completion of the cycle of the lever 61. The shelf remains in the extended position shown in dotted lines in Figure 2 until the tray of food is removed therefrom, whereupon the pawls are removed from engagement with the notches by means of springs 39, and the spring 21 draws the shelf 32 back to a normal position.

In operating the mechanism comprised in the present invention, entire meals are intended to be served, there being preferably from four to six selections available. Assuming for the purpose of the present description that four different meals are to be available for serving, four switch keys 56 are provided for each station, one for ordering each meal, and numbered from one to four upon a mounting plate adjacent each receiving station. The annunciator 97 (see Figures 6 and 7) in the kitchen is shown as being divided into three columns of four lights each, each column of lights being connected to the keys of one of the key mountings. For example, the first row of lights 97 in the annunciator may be connected one to each of the keys on the first key mounting 98. The second row of lights 99 may be connected one to each of the keys of the second key mounting, and the third row of lights to the keys of the third key mounting. Actuating the first key of the first key mounting would light the number one light in this first row of lights, indicating that meal one was desired at station number one. The meal would be prepared by an attendant working at the table 15 and placed upon the conveyor belt C. The attendant would then press the key 83 to energize the lever 52 for station number one. Upon the tray striking and actuating the lever 52 the member 53 is rotated out of engagement with the dog which it normally holds in a depressed position. This permits the dog to engage the internally toothed gear of the gear 43, causing a rotation of the timing cam 54 as previously described. Upon the completion of its cycle by the timing cam the switch 56 is closed, operating the solenoid 57 and moving releasing member 51 out of engagement with the dog 46. The tray then encounters the trip arm 58, moving the releasing member 49 associated therewith out of engagement with the dog 46. The other releasing member 51 having been previously released by the solenoid 57, this permits the coil spring 48 to move the dog 46 into engagement with the internally toothed gear of the gear 42 and causes a rotation of the lever 61. As the lever arm 61 rotates it moves the slide 23 forward, swinging the bell crank lever 25 upon its pivot to move the shelf outwardly into an actuated condition and simultaneously moving the transferring mechanism to transfer the tray from the conveyor to the shelf.

The lever completes its cycle moving the bell crank lever back to normal and also moving the plow mechanism back to normal to permit other trays to pass to stations more distant from the kitchen.

The tray of food resting upon the lever 38 holds the pawls out of engagement with the notches in the shelf supporting brackets until released by the removal of the tray by an attendant. This releases the pawls as previously described, permitting the shelf 32 to be returned to normal by the spring 21.

I claim:

1. A restaurant serving system having article conveying means, a plurality of deflectors positioned adjacent to and normally clear of said article conveying means, and timed actuating means associated with each of said deflectors and operable to deflect an article from the conveyor means by a predetermined deflector, as an article carried by said conveyor means reaches said predetermined deflector.

2. A restaurant serving mechanism having article conveying means, a deflector mounted adjacent to and normally clear of said article conveying means, actuating means operably connected to said deflector to move it into a deflecting position to deflect a tray of food from the article conveying means upon an actuation of said deflector, and timing means associated with said actuating means to cause an actuation thereof a predetermined time after an operation of said timing means.

3. A restaurant serving mechanism having conveyor means, deflector means mounted adjacent said conveyor means and having a normal position clear of said conveyor means, actuating mechanism operatively connected to said deflector means, locking means associated therewith to normally retain said deflector means in an inoperative position, and release means having timed relation with the rate of travel of an article carried by the conveyor means, said release means being mounted to release the deflector actuating mechanism after a predetermined travel of the article carried by the conveyor means to deflect the article therefrom.

4. A restaurant serving mechanism having conveyor means, a plurality of deflectors positioned adjacent to and normally clear of said conveyor means, timed actuating means associated with each of said deflectors and operable to deflect an article carried by the conveyor means after a predetermined travel of said article upon said conveyor means, and a normally concealed shelf having operative connection with the timed actuating means to be moved into a receiving position thereby upon an actuation of said timed actuating means to receive said article when deflected from said conveyor means.

In testimony whereof I affix my signature.

CHARLES B. ST. JOHN.